…

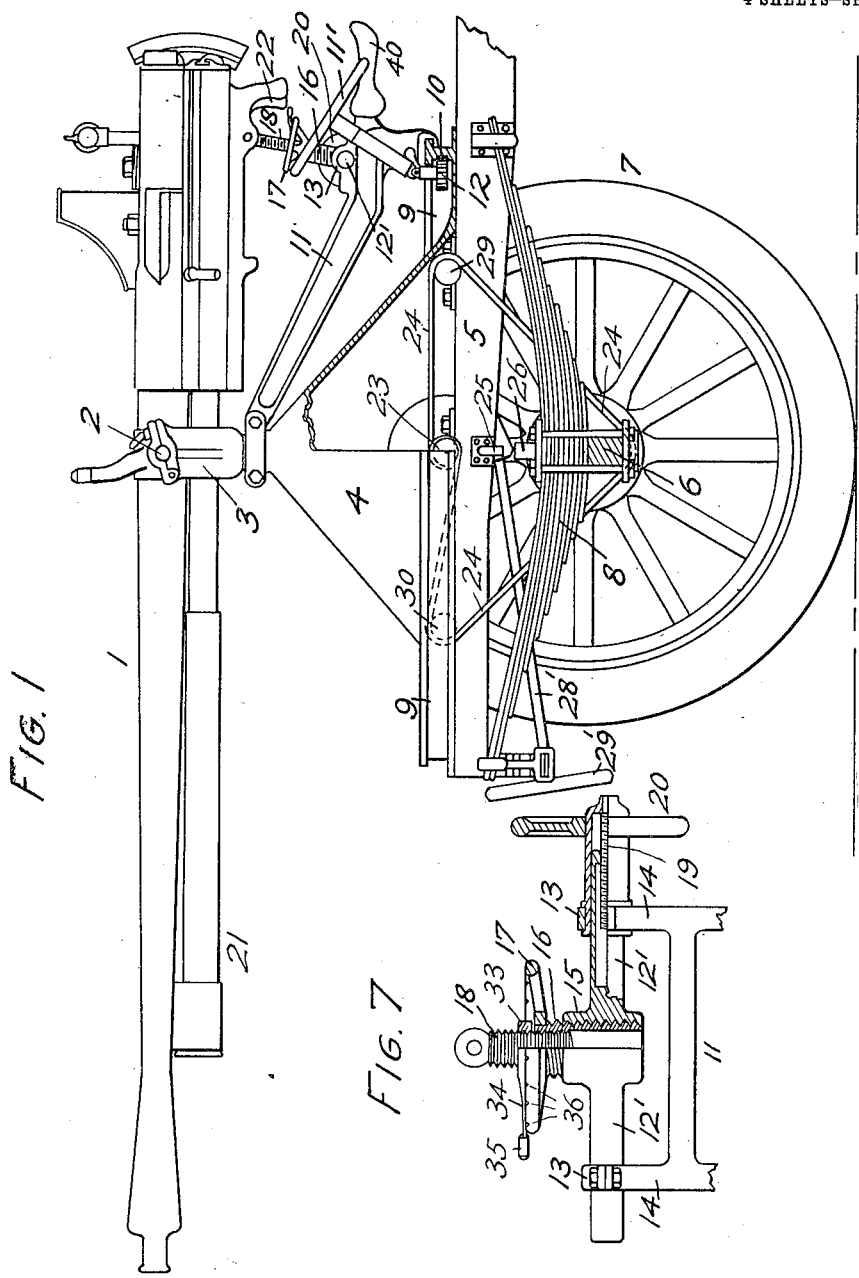

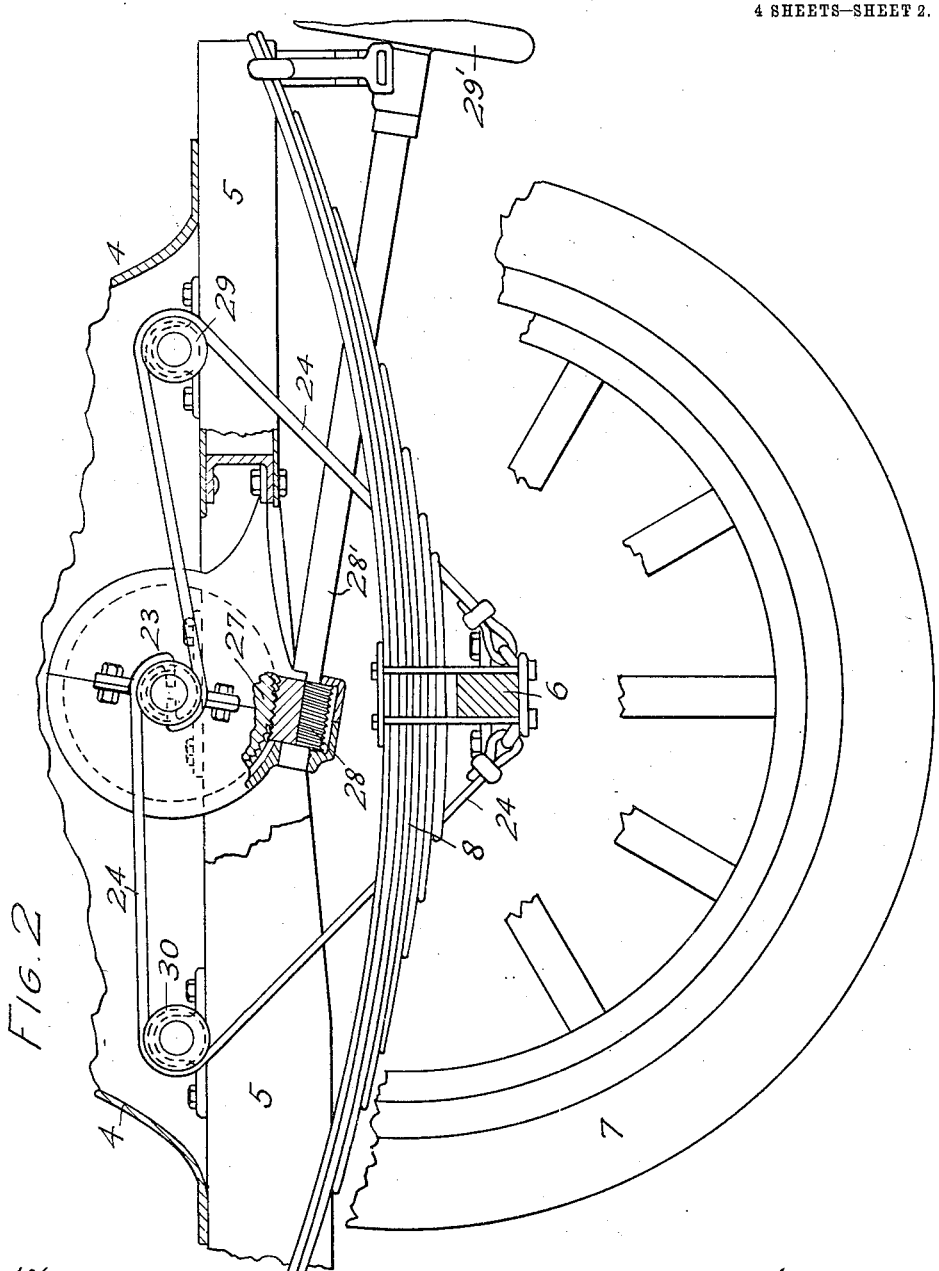

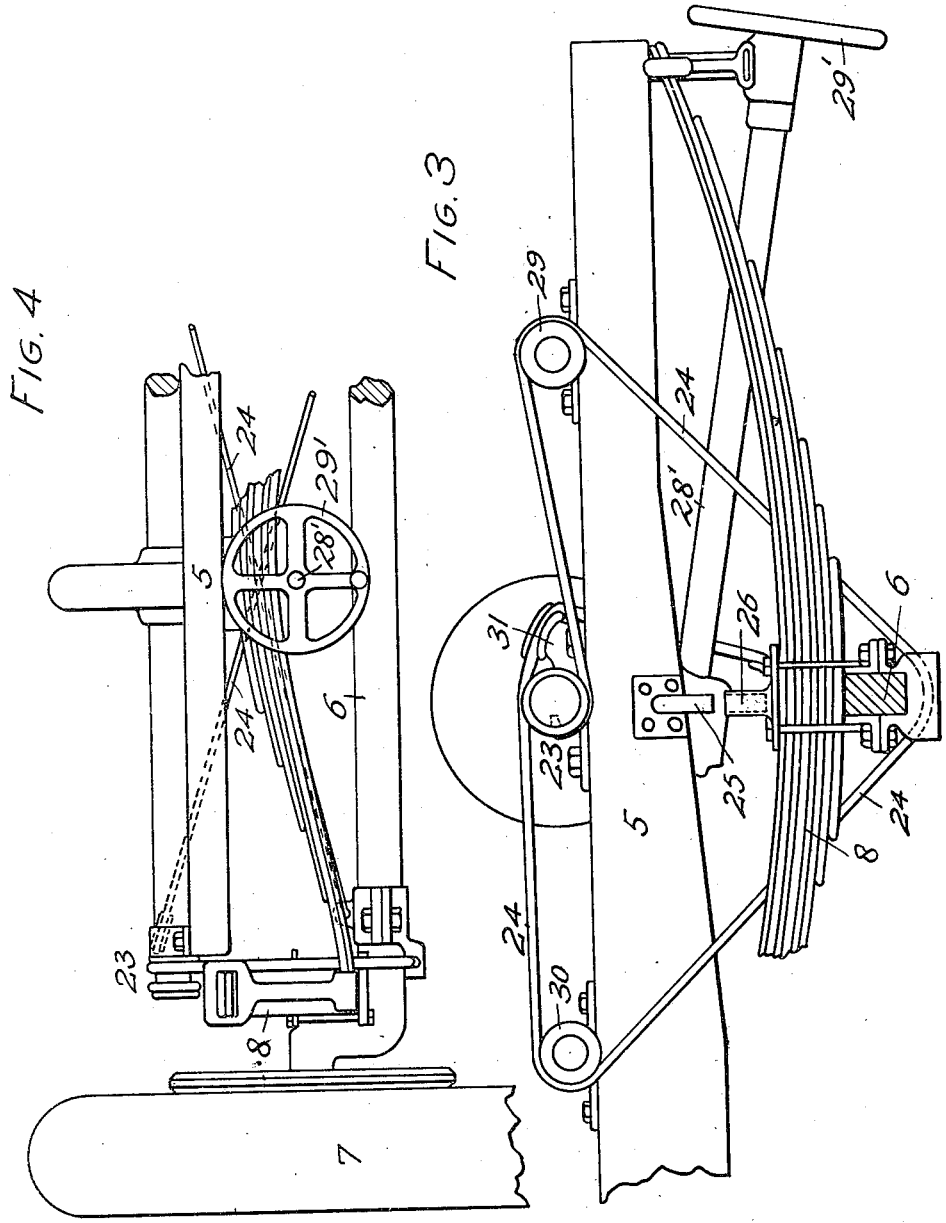

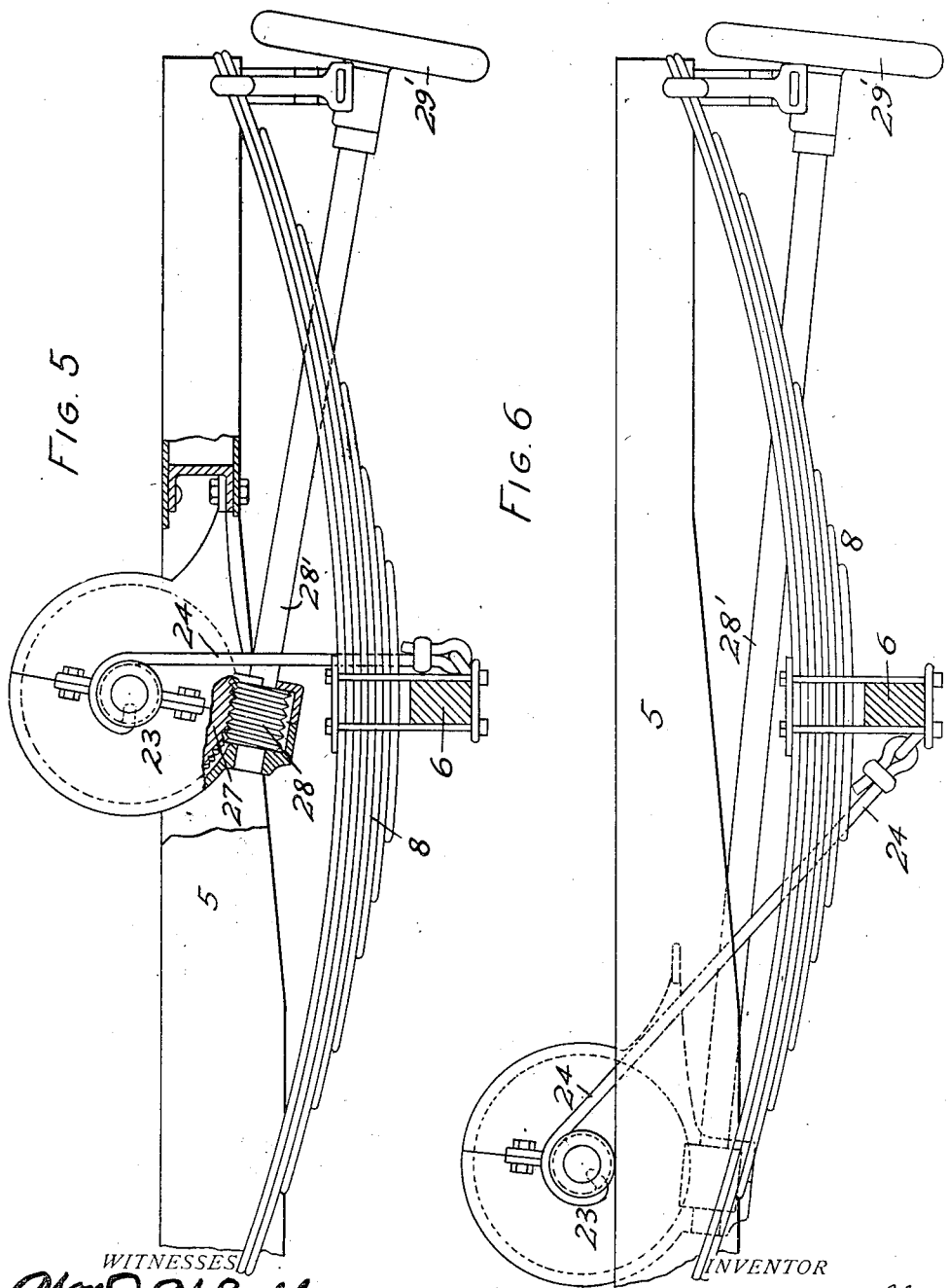

UNITED STATES PATENT OFFICE.

SAMUEL N. McLEAN, OF CLEVELAND, OHIO, ASSIGNOR, BY MESNE ASSIGNMENTS, TO THE AUTOMATIC ARMS COMPANY.

AUTOMOBILE GUN-MOUNT.

1,004,887.  Specification of Letters Patent.  Patented Oct. 3, 1911.

Application filed November 19, 1906. Serial No. 342,864.

*To all whom it may concern:*

Be it known that I, SAMUEL N. McCLEAN, a citizen of the United States, residing at Cleveland, in the county of Cuyahoga, State of Ohio, have invented certain new and useful Improvements in Automobile Gun-Mounts, of which the following is a description, reference being had to the accompanying drawings, forming a part hereof.

My invention relates to improvements in gun mounts and more particularly to improvements in power driven and automobile mounts.

The object of the invention is to construct a gun mount which shall have a large amount of resiliency and adjustment in passing over rough roads and which may be conveniently locked so as to produce the greatest possible rigidity and steadiness when the gun is in firing action.

A further object of the invention is to mount automatic ordnance on a common form of automobile chassis, the gun being mounted on the metallic frame of the chassis and being provided with a locking or tension device by which the chassis may be drawn into a firm and rigid locked engagement with the axle of the automobile.

In constructing automobiles, the engine and transmission device and other mechanical parts are carried rigidly attached to the frame of the chassis and the frame is supported from the axles by a spring or resilient connection so as to obtain freedom of movement and adjustment between the axle and the frame, thus to the greatest possible extent avoiding straining and injury to the engine and other parts due to the movement of the wheels in passing over rough roads, the object being to secure the greatest possible adjustment and the least possible jarring or injury to the working parts of the automobile. In the gun mount the principle of construction is exactly the opposite, guns being usually rigidly mounted on the wheel axle to secure the utmost rigidity and firmness and consequent accuracy of the gun in firing.

A further object of the present invention is to provide means for moving the spring supported frame of the chassis upon which the gun is carried in such a way that the force which the supporting springs exert upon the frame will be increased to a considerable degree, whereby the sensitiveness of said springs to vibrations produced by the firing of the gun is greatly lessened and the steadiness of the frame or platform upon which it is carried greatly increased.

A further object is to provide locking mechanism out of effective operation or disengaged when the supporting springs are in their normal condition as when the gun is being moved from place to place, but which locking mechanism may be brought into operation to rigidly lock the axle and supporting frame together when the gun is to be fired; thus producing a gun mount in which the supporting frame or platform has the greatest possible freedom of movement while the gun is being moved, and at the same time one in which the supporting frame or platform may be positively locked to the axle to secure a rigid mount when the gun is to be fired.

In the drawings, Figure 1 is a side view partly in section of the rear portion of an automobile gun mount embodying my invention. Fig. 2 is a similar view on an enlarged scale showing the means for drawing the chassis downward toward the axle, the arrangement of the cord or band being slightly different from that shown in Fig. 1. Figs. 3, 4, 5 and 6 are detail views showing modified arrangements of the cords or bands. Fig. 7 is a detail view of the elevating and traversing device.

Referring to the drawings, 1 represents an automatic gas operated one pounder cannon having trunnions 2 mounted in a yoke 3 free to turn in a bearing in an ordinary deck stand mount 4 which is secured to the frame 5 of the chassis of an automobile.

6 indicates the rear axle of the automobile and 7 indicates the wheels carried by the axle. The frame 5 of the chassis is supported from the axle 6 through springs 8 here shown as leaf springs of ordinary construction. The forward end of the frame is supported by springs corresponding to springs 8 from the forward axle and is provided with the usual seat and controlling and steering mechanism (not necessary to be here shown) and the automobile is also provided with the usual engine preferably connected to the rear wheels for driving (not necessary to be here shown).

The gun mount is provided with any convenient elevating and traversing devices. As shown the traversing device comprises a circular track 9 rigidly secured to the frame 5 and provided with a rack 10, and an arm 11 provided with a hand wheel 11' for operating a pinion 12 which engages the rack 10, to swing the gun to any point desired. The arm 11 has at one end a collar carried by the yoke 3 beneath the trunnions and at the other end is connected to the breech of the gun through elevating and auxiliary traversing devices and is also in engagement with the circular track 9. This arm is also provided at its free end with a seat 40 for the gunner. The elevating and auxiliary traversing devices comprise a horizontal bar 12' free to slide in bearings 13 carried by arms 14 of the arm 11 and having at its center a nut 15 adapted to receive a screw 16 operated by a hand wheel 17 and interiorly threaded to receive a screw threaded rod 18 hinged at its upper end to the breech of the gun as in the well known form of double telescoping screw elevating device. The bar 12' is adapted to slide in its bearings 13 and is operated to so slide by an interiorly threaded screw 19 operated by a hand wheel 20.

The cannon 1 is provided at its muzzle with a recoil checking device 21 and its breech mechanism is arranged to be operated by the gases of discharge, the firing being controlled by the trigger 22.

The cannon, its mount and the traversing and elevating mechanism so far as above described forms no part of my present invention and these parts may be varied in construction and operation, it being essential only for the purposes of this inventon that the gun be so constructed that its recoil will be controlled and that its mount be secured to the chassis.

The preferred mechanism for holding the frame carrying the gun mount rigidly with respect to the rear axle comprises a windlass 23 carried by the axle or by the frame and cords or bands 24 preferably consisting of a wire cable secured to or passing about a stud or bar on the frame or about the axle and connected to the windlass so that when the windlass is operated to wind up the cords or bands 24 the frame and axle will be drawn together against the force of the springs 8 putting them under compression and holding the frame more or less firmly against both vertical and horizontal movement with reference to the axles depending upon the strain put upon the cords. The cords or bands 24 are preferably drawn up by the windlass sufficiently to put the springs under such compression that the resistance offered by them will take up any shock of recoil which there may be when the cannon is fired and maintain the gun in position.

When it is found desirable to secure an absolutely rigid connection between the frame and the axle, suitable locking means are provided for locking these parts together, which means are here shown as a pin 25 carried by the frame 5 and adapted when the frame and axle are drawn together by the operation of the windlass as above described to enter a socket 26 carried by the axle. This arrangement may, however, be reversed or otherwise modified so long as the locking function herein specified is carried out.

The windlass 23 is preferably carried by the frame and is provided with a worm gear 27 with which engages a worm 28 carried by a shaft 28' having a hand wheel 29' for rotating it. The cords or bands 24, which may be of any form of flexible connections, may be arranged in any convenient way to secure the drawing together of the frame and axle when the windlass is operated. In Fig. 1, a single cord or band 24 is used secured at both its ends to the windlass and passing from the windlass over a pulley 29 carried on the frame forward of the axle, thence downward under the axle, thence rearward over a pulley 30 on the frame and thence forward to the windlass. In Fig. 2, two cords or bands 24 are shown each connected at one end to the windlass and at its other end to the axle, one of the cords or bands passing over pulley 29 and the other over pulley 30.

In Figs. 3 and 4, an arrangement is shown in which one of the cords 24, connected at one end to a drum on one end of the windlass shaft, is led over the pulley 29 on the same side of the vehicle, thence downward across the vehicle beneath the axle 6 at the other side of the vehicle, thence across the vehicle back to the side from which it started over pulley 30 and guide block 31, thence downward to the axle where its end is secured. The other cord 24 is attached to the drum on the other end of the windlass shaft and is led over the pulley 29 on that side of the vehicle downward across the vehicle to the other side and back as above described, the two cords or bands 24 thus crossing each other as indicated in Fig. 4, so that when the windlass is operated the frame is put under tension both vertically and laterally of the vehicle.

In Fig. 5, the cord or band 24 extends directly downward from the windlass to the axle. In Fig. 6 the windlass is located forward of or in rear of the axle so that the strain will be forward, or rearward, as well as vertical. In Figs. 5 and 6, the cord or band extends downward to the axle on one side of the vehicle, but if preferred it may extend across the vehicle as in the arrangement shown in Fig. 4.

The drums on which the cords or bands 24 are wound are preferably located at the ends of the windlass shaft and the worm gear 27 is located midway between the ends of the windlass shaft, the hand wheel 29' being located at the rear of the vehicle for convenience of operation.

The arrangement of the cords or bands may be varied in other ways than those shown in the drawings, which are illustrative merely, it being essential only that they be so arranged that when the windlass is operated, the frame and axle will be drawn toward each other against the force of the springs 8.

In Fig. 7, I have indicated a locking device for locking the screw 16 against movement. This consists of a lock nut 33 provided with a radial slightly elastic arm 34 provided with a handle 35 and with means for engaging notches 36 formed in the upper face of the rim of the hand wheel 17. When the screw has been rotated by means of the hand wheel 17 to elevate or depress the breech of the gun to the desired point, the handle 35 is swung relative to the rim of the wheel to force the lock nut 33 against the end of the screw thus locking it against movement.

It will of course be understood that I do not desire to be limited to the construction or arrangement shown in the drawings as the precise construction and arrangement in which the invention is embodied may be varied.

I claim:—

1. In a vehicle in which the body is supported from an axle by interposed resilient means, interlocking means carried by the body and axle normally held out of engagement by the resilient means, and means carried by the body for compressing said resilient means to bring said interlocking means into engagement.

2. In a vehicle in which the body is supported from an axle by interposed resilient means, interlocking means carried by the body and axle normally held out of engagement by the resilient means, and means for compressing said resilient means for bringing said interlocking means into engagement.

3. In a gun mount, an axle; a frame; a spring interposed between said frame and axle and normally supporting said frame; locking members normally out of engagement for locking said frame and axle together; a flexible member extending between said frame and axle; and means for subjecting said flexible member to tension to thereby depress said frame against the resistance of said springs and bring said locking members into engagement.

4. In a gun mount, an axle; a frame; springs interposed between said frame and axle for normally supporting said frame; a locking member carried by the frame and a second locking member carried by the axle, said locking members being normally out of engagement; a flexible member extending between said frame and axle; and means for subjecting said member to tension to thereby depress said frame against the resistance of said springs and bring said locking members into engagement.

5. In a gun mount, an axle; a frame; a spring interposed between said frame and axle and normally supporting said frame; a locking member carried by said frame; a second locking member carried by said axle; said locking members being normally out of engagement; a flexible member extending between said frame and axle; and means carried by said frame for subjecting said flexible member to tension to thereby depress said frame against the resistance of said spring to bring said locking members into engagement.

6. In a gun mount, an axle; a frame; springs interposed between said frame and axle and normally supporting said frame; a flexible member extending between said frame and axle; and means carried by the frame for subjecting said flexible member to tension to thereby depress said frame and compress said springs.

7. In a gun mount, an axle; a frame; springs interposed between said frame and axle and normally supporting said frame; a flexible member extending between said frame and axle, one end thereof being connected to a windlass; and means for rotating said windlass to thereby depress said frame and compress said springs.

8. In a gun mount, an axle; a frame; springs interposed between said frame and axle and normally supporting said frame; a windlass carried by said frame; a flexible member, one end thereof being connected to said axle and the other to said windlass; and means for rotating said windlass to thereby depress said frame and compress said springs.

9. In a gun mount, an axle; a frame; springs interposed between said frame and axle and normally supporting said frame; locking members normally out of engagement for rigidly locking said frame and axle together; and means carried by said frame for moving said frame against the resistance of said springs to thereby bring said locking members into engagement.

10. In a gun mount, an axle; a frame; springs interposed between said frame and axle and normally supporting said frame; locking members normally out of engagement for rigidly locking said frame and axle together; and means carried by said frame for depressing said frame against the resistance of said springs to thereby bring said locking members into engagement.

11. In a gun mount, an axle; a frame; springs interposed between said frame and axle and normally supporting said frame;

locking members normally out of engagement for rigidly locking said frame and axle together, and means carried by said frame for moving said frame in a vertical direction to thereby bring said locking members into engagement.

12. In a gun mount, an axle; a frame; springs interposed between said frame and axle and normally supporting said frame; a locking member carried by the frame and a second locking member carried by the axle, said locking members being normally out of engagement; and means carried by said frame for moving said frame against the resistance of said springs to thereby bring said locking members into engagement.

13. In a gun mount, an axle; a frame; springs interposed between said frame and axle and normally supporting said frame; a locking member carried by the frame and a second locking member carried by the axle, said locking members being normally out of engagement; and means carried by said frame for moving said frame vertically against the resistance of said springs to thereby bring said locking members into engagement.

14. In a gun mount, an axle; a frame; springs interposed between said frame and axle and normally supporting said frame; a locking member carried by the frame and a second locking member carried by the axle, said locking members being normally out of engagement; a member extending between said frame and axle; and means for subjecting said member to tension to thereby depress said frame against the resistance of said springs and bring said locking members into engagement.

15. In a gun mount, an axle; a frame; springs interposed between said frame and axle and normally supporting said frame; a locking member carried by the frame and a second locking member carried by the axle, said locking members being normally out of engagement; a member extending between said frame and axle; and means carried by the frame for subjecting said member to tension to thereby depress said frame against the resistance of said springs and bring said locking members into engagement.

16. In a gun mount, an axle; a frame; springs interposed between said frame and axle and normally supporting said frame; a locking member carried by the frame and a second locking member carried by the axle, said locking members being normally out of engagement; a flexible member extending between said frame and axle, one end thereof being connected to a windlass; and means for rotating said windlass to thereby depress said frame against the resistance of said springs and bring said locking members into engagement.

17. In a gun mount, an axle; a frame; springs interposed between said frame and axle and normally supporting said frame; a locking member carried by the frame and a second locking member carried by the axle, said locking members being normally out of engagement; a windlass carried by said frame; a flexible member, one end thereof being connected to said axle and the other to said windlass; and means for rotating said windlass to thereby depress said frame against the resistance of said springs and bring said locking members into engagement.

This specification signed and witnessed this 16th day of October A. D. 1906.

SAMUEL N. McCLEAN.

In the presence of—
A. P. GREELEY,
WM. J. WHALLEY.